May 21, 1957 M. C. THOMPSON 2,793,015
EVAPORATIVE AIR-CONDITIONING APPARATUS
Filed Dec. 23, 1953 2 Sheets-Sheet 1

INVENTOR,
MARCUS C. THOMPSON
BY
ATTORNEY

May 21, 1957 M. C. THOMPSON 2,793,015
EVAPORATIVE AIR-CONDITIONING APPARATUS
Filed Dec. 23, 1953 2 Sheets-Sheet 2
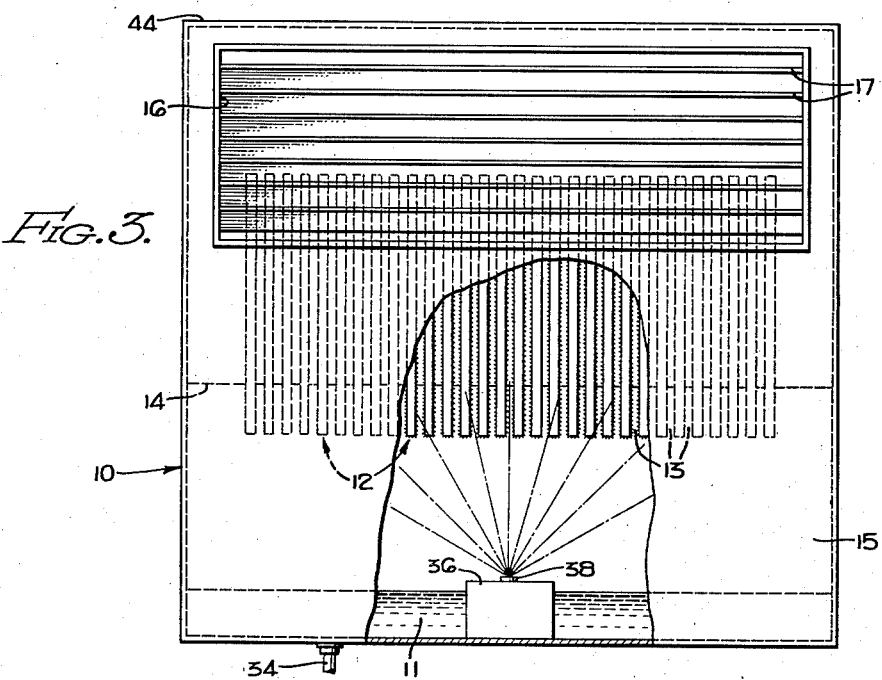
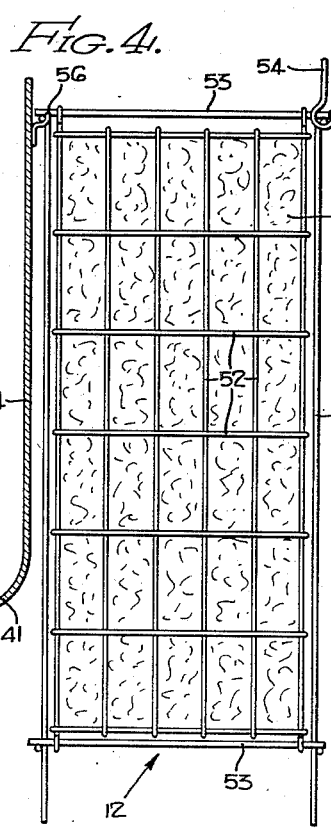
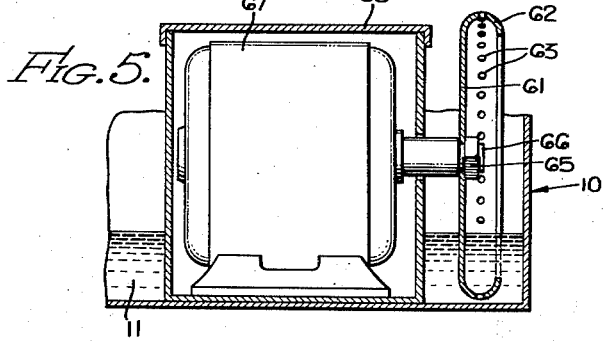
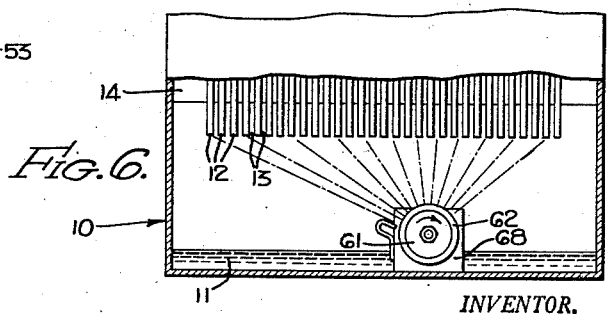
INVENTOR,
MARCUS C. THOMPSON
BY
ATTORNEY

United States Patent Office

2,793,015
Patented May 21, 1957

2,793,015

EVAPORATIVE AIR-CONDITIONING APPARATUS

Marcus C. Thompson, Pasadena, Calif.

Application December 23, 1953, Serial No. 399,859

2 Claims. (Cl. 261—29)

This invention relates to an air conditioning apparatus, and particularly to a device adapted to effect cleaning and evaporative cooling of an air stream entering a house, office building or the like. The present application constitutes a continuation-in-part of my now abandoned application Serial No. 103,610, filed July 8, 1949, for an Evaporative Air Cooler.

The air conditioning of the home and the office for the purpose of lowering the temperature during the summer season is almost as important in certain parts of the country as is the presence of a furnace for the purposes of heating the air in other parts. The cooling operation can be effected in a number of ways as by passing the air over heat-absorbing coils forming a part of a refrigeration system. In some sections of the country, and specifically the southwestern part of the United States, the extremely low humidity makes it possible to effect the cooling function by the evaporation of moisture. Hot, extremely dry air passing in contact with water particles or vapor effects evaporation and heat is absorbed. The cooled air with its increased moisture content is then passed directly into the space to be conditioned with resulting increased human comfort.

While the broad principle of the evaporative air cooler has long been known, the usual installation has been characterized by the forcing of the air directly through filters in which the moisture was to evaporate. This inherently increased the resistance to the flow of air and reduced the efficiency and effectiveness of the unit. Also, in certain parts of the country and at certain seasons the air carries relatively large quantities of foreign material such as dust which collects upon or in the filter, tending to clog it. In the air conditioning unit constructed in accordance with the present invention the air to be conditioned passes through a spray of minute water particles, mist or vapor, and into contact with pads which become saturated and coated with moisture. Thereafter, the unevaporated water and the particles of foreign material are separated from the air stream by centrifugal force. Due to the arrangement of the pads, the flow of air would not be blocked or substantially impeded even if large amounts of foreign material were to collect on the pads.

In addition to the very important problem of providing an evaporative cooler which will not clog up with the passage of time, it is, of course, essential that the cooler will be one which will effect a high degree of cooling and in a very small space. Not only must the degree of cooling be high, but the cooling action must be such that the passing air stream is not saturated with water, since saturated air is uncomfortable to the occupants of the building being air conditioned. An additional important problem is that of providing a sufficient amount of cooling and cleaning water to effect the desired air conditioning, and without resulting in the wastage of water which has become critical in arid regions.

In view of the above factors characteristic of air conditioning apparatus of the type indicated, it is an object of the present invention to provide an air conditioning apparatus which effects an extremely high degree of cooling in a small space and without increasing excessively the humidity of the air stream, and which does not clog and increase the air flow resistance despite long continued use in cooling and cleaning dust-laden air.

Another object of the invention is to provide an air conditioning apparatus incorporating novel means for spraying water into the air, and for centrifugally separating water and dirt particles from the air, while using a minimum of water.

It is another object of the present invention to provide a new and improved cooler of that type in which the incoming air is cooled by being brought into immediate contact with water and vapor, the unevaporated portions or parts of which are subsequently separated by centrifugal force.

These and other objects and advantages will be more fully set forth in the following specification and claims considered in connection with the attached drawings to which they relate.

In the drawings:

Figure 3 is an end view of the apparatus, viewed from the right in Figure 1, and with a portion of the wall broken away to illustrate the spray and pad means;

Figure 4 is an enlarged elevational view of one of the filter pads, illustrating the method of mounting the same;

Figure 5 is a detail view of the water spray means of a second embodiment of the invention; and Figure 6 is a fragmentary end view corresponding generally to Figure 3 but illustrating the operation of the water spray means shown in Figure 5.

Figure 1:
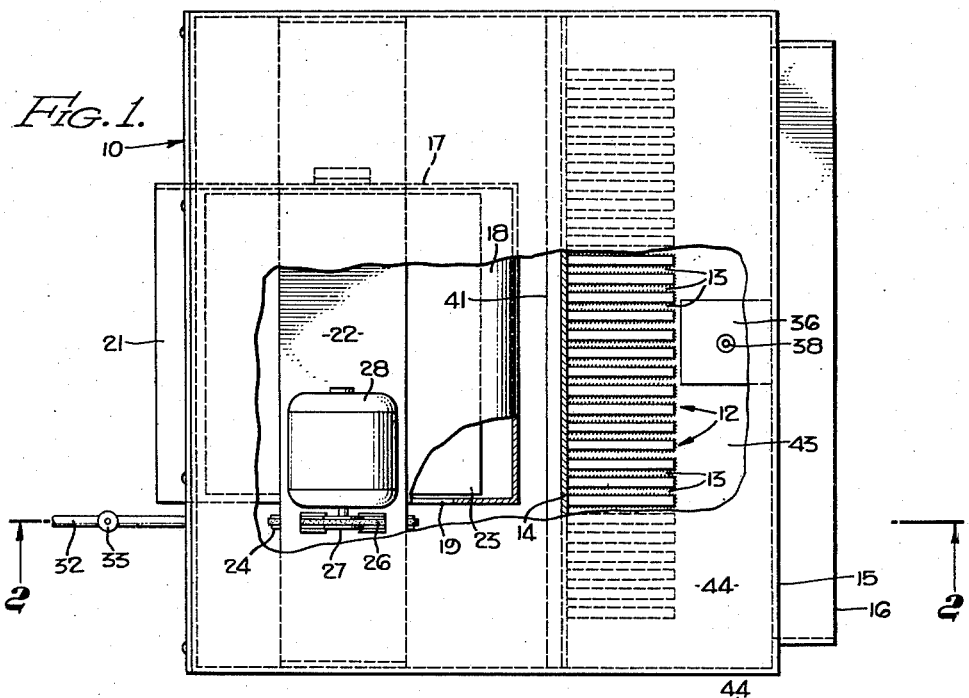
Figure 1 is a top plan view of a unit constructed in accordance with the present invention, and with a portion of the top wall broken away to show the operating mechanism positioned therein.
Figure 2:
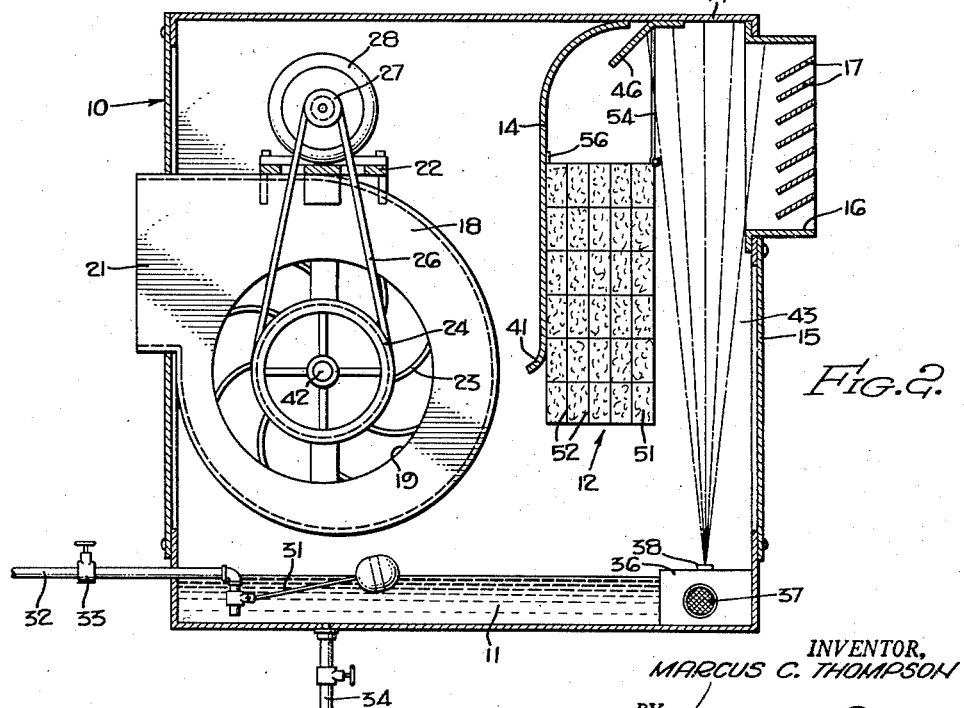
Figure 2 is a vertical sectional view taken along line 2—2 of Figure 1.

Referring to the drawings, and to Figures 1 and 2 in particular, an evaporative air cooler constructed in accordance with the present invention is illustrated and is seen to comprise a casing, which may be generally rectangular in its vertical and horizontal sections, and which is indicated generally by the reference character 10. The casing includes at its bottom a water-tight lower section, which may be integral if preferred, forming a reservoir or receptacle 11. The entire casing may be fabricated from sheet metal members and the exact connections between the walls, sides, and bottom are not of the essence.

Positioned within the casing 10 are a substantial number of generally flat, rectangular, vertically extending pads 12 positioned parallel to the air flow direction, and to the casing side walls. Pads 12 are spaced apart to form vertical channels 13, as is most clearly illustrated in Figures 1 and 3, and their upper and lower edges are spaced from both the top and the bottom walls of casing 10. The pads are suitably mounted, as will be described, adjacent a vertically extending baffle plate 14 which at its upper end curves rearwardly into contact with the top wall of casing 10. The upper portion of the adjacent rear wall 15 of the casing is formed with an inlet opening 16 which may extend its entire width and through which incoming air enters the unit. Preferably, inlet opening 16 is provided with louver boarding 17 of any suitable type.

A centrifugal blower or fan unit comprising a housing 18 formed with side inlet ports 19 and a tangential exhaust outlet 21 which passes outwardly through the forward wall of the casing 10 opposite rear wall 15, is suitably mounted within casing 10 upon a transversely extending support plate or platform 22 and spaced from pads 12 and baffle 14. The air which enters the casing 10 through inlet 16 passes through housing 18 and its outlet 21 so that the latter in fact comprises the outlet port of the casing 10 itself.

A centrifugal impeller 23 is rotatably mounted within housing 18, its shaft carrying at one end a pulley 24. The pulley 24 is connected by a belt 26 to a second pulley 27 mounted upon the shaft of an electric motor 28, the latter being secured on the top of supporting platform 22. Rotation of fan rotor 23 at high speed under the driving power received from motor 28 causes air to be drawn from that part of the casing 10 in which it is positioned, and which may be referred to generally as the air circulation or blower chamber as distinguished from that part of the casing rearward of the baffle 14 which may be referred to as the spray or evaporating chamber, and exhausted to the exterior through outlet 21.

The lower portion of casing 10 is formed as the tank or receptacle 11 which functions as a reservoir for a body of water fed through a supply pipe 32 under the control of a manually operable valve 33 and a ball cock 31. A suitable valve-controlled drain 34 is also present, and enables receptacle 11 to be drained as desired.

A water vaporizer unit, indicated at 36, is positioned in the water reservoir with its inlet 37 below the fluid level and its outlet 38 thereabove and immediately adjacent the rear casing wall 15. The vaporizer may be of any conventional type adapted to convert water into a mist or spray and to project it upwardly for a distance sufficient to reach the inlet 16.

The general construction of the air conditioning apparatus having been indicated briefly, there will next be set forth the critical operating relationships, dimensions, velocities, and other factors essential to the present invention.

There will first be described the factors by which the pressure drop through the unit, that is to say the resistance which the unit presents to the flow of air, is maintained at a minimum. It is essential that the air flow resistance be maintained at a low value, such as one-fourth inch of water column at an air velocity of one thousand feet per minute, in order to increase the overall air flow and to reduce the power requirements of the air conditioner.

The first and most important factor in the reducing of the air flow resistance is the presence of the channels 13 between pads 12, and which will not become blocked despite any accumulation of dust on the pads. This is to be contrasted with conventional evaporative cooling apparatus wherein the air is sucked through moisture saturated pads which offer a substantial impedance at all times, and especially after they become blocked with dust. A second important factor is the spacing between the lower edge 41 of baffle 14, and which is curved toward the blower to prevent creation of turbulence as the air changes direction, and the upper surface of the water in receptacle 11. This spacing is substantially greater than that which would be required to merely accommodate the number of cubic feet of air passing through the apparatus, since the abrupt change in the direction of air flow as it curves around the lower baffle edge 41 creates a severe action which must be compensated for by increasing the cross sectional area of the passage or opening between the baffle and the water. Another critical spacing is the distance between the side walls of blower housing 18 and the corresponding side walls of the casing 10. This spacing must be, on each side of the blower, at least half of the diameter of blower rotor or impeller 23 in order to maintain the low pressure drop through the unit.

Referring particularly to Figure 2, it is pointed out that the axis 42 of impeller 23, and thus the central portions of blower ports 19, lie in approximately the same horizontal plane as lower baffle edge 41. This position is also critical and important to the maintenance of the low pressure drop, and for other reasons. Thus, if the blower shaft or axis 42 were disposed a substantial distance below the baffle edge 41, dust and water particles would be sucked into the blower and discharged through its outlet 21, there being no adequate chance for centrifugal separation of the dust and water as the air stream changes direction beneath the baffle edge. Also, if the shaft or axis 42 were disposed a substantial distance above baffle edge 41, the air stream would only enter the lower portions of ports 19, which would have the effect of increasing the resistance which the blower presents to the air flow. When, however, the elevations of axis 42 and edge 41 are substantially the same, air enters all portions of ports 19 so that the flow resistance is not increased, yet no water and dust tend to enter the blower.

There will next be described the factors and elements by which very substantial air cooling and cleaning is effected with a minimum of water. As best illustrated in Figures 2 and 3, the spray unit 36 is disposed in the central plane of casing 10 and adjacent the rear casing wall 15. The unit is adapted to eject water from its outlet 38 upwardly through a passage or channel 43 formed between wall 15 and the rear edges of pads 12. The provision of the channel 43 permits the centrally located water ejector or vaporizer 36 to spray the entire air stream, and the upper casing wall 44, adjacent intake opening 16.

The water spray directed upwardly against wall 44, adjacent the intake opening, is blown by the rapidly flowing air onto the pads 12 to effect their saturation, so that the pads are maintained wet and are continuously flushed and cleaned by water flowing downwardly through them and back into the receptacle 11. To increase the amount of the water blown onto the pad portions relatively adjacent intake opening 16, as distinguished from immediately adjacent baffle 14, a drip bar 46 is mounted on wall 44 for the full width of the casing 10. Because of the presence of the drip bar, water directed against wall 44 is blown along the drip bar surface and dropped off its lower edge above the central pad portions, thus operating to effect the even wetting of all sections of the pads.

As the air stream enters intake opening 16 it not only blows the water spray onto pads 12 but is itself, when passing through the water spray, somewhat cleaned and also cooled by absorbing some of the water vapor. However, the primary cleaning and evaporative cooling actions occur as the air stream passes through and adjacent the pads 12, and beneath the baffle edge 41, as will be described in detail subsequently.

The ball cock 31 is so constructed that it has the effect of maintaining the water level in the receptacle 11 constant, despite losses due to evaporation and other factors. Thus, there is always adequate water to feed to intake opening 37 of spray member 36, and the distance between baffle edge 41 and the water surface is maintained constant so that the air-resistance characteristics of the apparatus do not change. The water in receptacle 11 not only serves as a source of supply for spray water, but also has the very important function of cleaning the air which passes downwardly through pads 12 and then back upwardly into intake ports 19 of the blower. Thus, particles of dirt and foreign matter entrained in the in-flowing air stream, and abruptly changing direction beneath baffle edge 41, are centrifugally thrown into the water where they are immediately wet and tend to sink to the receptacle bottom from which they may be cleaned periodically. As previously indicated, the unevaporated water entrained in the air stream as it passes beneath baffle edge 41 is also thrown into the receptacle so that neither it nor the entrained dirt particles enter blower intakes 19 for discharge through outlet 21. The described centrifugal separation of dust and water particles in some instances occurs independently, and in some instances occurs together since some of the dust particles have previously been wet upon passing through the water spray and adjacent the pads 12. When the dust particles are thus wet prior to their contact with the water in receptacle 11, the centrifugal separation action is enhanced since the particles are heavier and thus more readily thrown into the water.

The described arrangement for spraying water into the air stream and for saturating the pads 12 is to be distinguished from arrangements by which fresh water is constantly piped or sprayed onto filter elements, or through the air stream, and also from arrangements by which water is sprayed directly against the filter elements. According to the present invention the water is recycled continuously from receptacle 11 upwardly into the air stream and back to the receptacle so that little or no wastage results. Furthermore, and very importantly, the water is first sprayed into the air stream adjacent intake opening 16, so that it effects a cleaning and cooling of the air such as would occur when air passes through a mist chamber. Thereafter, the same water is directed by the air stream onto the pads 12 to wet and flush them, and thus condition the pads for the cleaning and cooling function next to be described. The same sprayed water is thus used for a plurality of functions, with the air stream being utilized to direct the water so that several cleaning and cooling operations are effected by water from a single spray device.

There will next be described the structure and operation of the pads 12, which constitute essential factors or elements in the effective and efficient cooling and cleaning of the air stream. As previously indicated, pads 12 are mounted adjacent baffle 14 and are spaced from casing walls 44 and 15 and from the surface of the water in receptacle 11. Preferably, the lower portions of the pads extend a substantial distance beneath baffle edge 41, so that air will still be passing between them as it changes its direction. It is pointed out that the air flows horizontally through the intake opening 16 and then is redirected downwardly by the curved baffle 14, and by drip bar 46, so that it flows vertically downwardly adjacent baffle 14 until it reaches baffle edge 41. At this point it changes direction and flows horizontally between baffle edge 41 and the surface of the water, and then flows upwardly into intake openings 19 of the blower. It is to be understood that only a relatively small percentage of the air flows through the channel 43 between casing wall 15 and the rear pad edges. This is because the intake opening is not above the pads 12 but is in the vertical casing wall 15, so that the air in changing direction from a horizontal to a downward direction tends to crowd adjacent baffle 14 and thus flow between and through channels 13 and pads 12.

According to the invention, the pads 12 are relatively thick and, preferably, are of greater thickness than the channels 13 between them. Each pad is preferably formed of uncoated spun glass and should be approximately three-fourths inch in thickness, being separated from each adjacent pad by a distance of one-half inch which constitutes the width of channels 13. The pads are of substantial size, ranging from ten inches in width and eighteen inches in length to twelve inches in width and thirty inches in length, and are mounted in axially spaced relationship for substantially the full width of casing 10. The number of pads in a particular unit may range from thirty to sixty, depending upon the size and capacity of the installation.

Because of the fact that the pads 12 have substantial thickness and are spaced only a relatively short distance from each other, a very substantial portion of the incoming air stream flows longitudinally through the pads themselves, that is to say around and between the individual moistened glass fibers, so that this portion of the air becomes saturated with moisture. However, another substantial portion of the air flows through the channels 13 and is not saturated but instead is relatively dry. As the air flows downwardly from intake opening 16 to the opening beneath baffle edge 41, a continuous transfer of moisture is effected between the saturated air inside the pads 12 and the relatively dry air in channels 13. This transfer of moisture is such that when the air moves away from the lower pad portions it is not saturated, but is substantially more moist than the air flowing through the channels 13. The described action produces a very high degree of cooling in a very short space, but without undesirable total air saturation such as is effected in many air conditioners where all of the air flows through a water saturated filter. Not only does substantial cooling result without excessive humidity, but the air is effectively cleaned both while flowing through the pads 12 and through channels 13, due to the dust particles clinging to the moistened glass fibers. Any remaining dust and water particles still present in the air stream after it leaves the pads are centrifugally separated in accordance with the principles set forth above.

Referring next to Figure 4 of the drawings in which a single pad 12 is illustrated, the spun glass 51 is shown as held in place by means of a welded latticework of metal rods 52, there being one latticework on each side of the spun glass 51. Each latticework of rods 52 is connected at its upper and lower ends to a welded rectangular frame 53 which in turn is supported on hooks 54 dependent from upper casing wall 44, and from hooks 56 on baffle 14. With the described construction, the spun glass 51 of each pad 12 is held in the desired location relative to the spun glass of the other pads, and relative to the air stream, with a minimum resistance to the flow of air.

To briefly summarize the operation of the apparatus shown in Figures 1–4, air enters through intake opening 16 and then passes through the water spray from spray unit 36 so that it is somewhat cleaned and cooled. As it passes through the water spray, it carries the particles of water over onto pads 12 which become wet and are continuously flushed and cleaned by the water, the latter then flowing downwardly by gravity into receptacle 11. The receptacle 11 is, in turn, maintained full of water by means of the ball cock 31 controlling the flow of water through intake pipe 32.

The air stream passes longitudinally through the fiber glass pads 12 and also through the channels 13 between them, with the saturated air within the pads operating through moisture transfer to increase the humidity of the air in the channels, and as described in detail previously. The air flowing through and adjacent the pads 12 is thus cooled by evaporation, and is additionally cleaned in that the dirt particles therein tend to remain on the moistened glass fibers until flushed into receptacle 11. Any remaining water, dirt, or moistened dirt particles in the air stream as it passes below baffle edge 41 are centrifugally separated as the air flow changes direction, and drop into the receptacle 11 from which they are periodically cleaned. The air thus cleaned and cooled enters the intake openings 19 of the blower, and is discharged through outlet 21 from which it may be conducted to the rooms of a house or office building.

The blower unit is operated to move the air at high velocities, preferably approximately one thousand feet per minute, so that a large number of cubic feet of air may be transmitted to the room to be air conditioned, and so that a large amount of centrifugal separation occurs beneath baffle edge 41. Because of the construction and mounting of the pads 12, and the operation of the spray means 36, the air is greatly cooled and cleaned despite the fact that the pads are relatively small and the air is moving extremely fast. In a typical unit, having an eighty percent efficiency, the air is cooled from 100° Fahrenheit to 76° Fahrenheit in the matter of a few seconds, and without increasing the humidity to an uncomfortable degree. The amount of cooling obtained is the same as would be obtained upon passing the air through nine feet of water spray, yet the pads 12 have a maximum dimension of only two or three feet.

Referring next to the second embodiment of the invention, illustrated in Figures 5 and 6, the structure is the same except that a different spray means is employed in place of the spray means 36 shown in Figures 1-3. The spray means may be seen upon reference to Figure 5 to comprise a vertically disposed disc 61 the peripheral edge 62 of which is spun over and provided with a series of arcuately spaced peripheral ports 63. Disc 61 is mounted, by means of a nut 65, on the shaft 66 of a suitable electric motor 67, the latter being enclosed in a water tight housing 68. Referring to Figure 6, the locations of motor 67 and housing 68 are such that disc 61 is disposed in a plane parallel to and relatively adjacent casing wall 15. Furthermore, the disc is disposed generally on the central plane of the casing 10, and with its lower portion submerged in the water in receptacle 11.

Upon operation of motor 67 and consequent rotation of disc 61, the water within the spun over edge 62 is centrifugally thrown through the ports 63 and upwardly through channel 43 against casing wall 44 adjacent the intake opening 16. The apparatus thus described comprises a very effective means of providing a uniform water spray and without the feeding of a large amount of power to the motor 67.

It is to be understood that the successful operation of the spray means shown in Figures 5 and 6, and also of the means shown in Figures 1-3, is dependent upon the previously mentioned crowding of the incoming air against the baffle 14 as it changes from horizontal to downward flow. There is, in fact, a negative air pressure and an absence of turbulence in the lower portions of channel 43, permitting the spray means to throw the water upwardly to intake opening 16. The described action, which could not occur if opening 16 were in upper wall 44 instead of rear wall 15, permits the single low-power spray unit to replace the relatively expensive and inefficient pumps and headers which would otherwise be required. Headers, in particular, are highly undesirable since their numerous outlet orifices are frequently clogged by the minerals carried by the water flowing through them.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. An air cooling and cleaning apparatus, which comprises a generally rectangular casing having spaced parallel front and rear walls, a baffle provided in said casing generally parallel to said front and rear walls and intermediate the same, said baffle extending downwardly from the upper wall of said casing to a lower edge spaced a substantial distance above the bottom portion thereof, an air intake opening formed in said rear casing wall and substantially above said lower baffle edge, a centrifugal blower mounted in said casing between said baffle and said front casing wall, said blower being adapted to draw an air stream at a high velocity through said intake opening and downwardly around said lower baffle edge for discharge through an outlet in said casing and to a building to be air conditioned, rows of vertically arranged air-pervious pads mounted parallel to each other between said baffle and said rear casing wall and disposed in planes perpendicular to the planes of said front and rear casing walls and of said baffle with their front edges adjacent said baffle and with their top, bottom and rear edges spaced substantial distances, respectively, from the corresponding walls of said casing, said pads being of substantial thickness and being spaced substantial distances from each other, means to fill the bottom portion of said casing with water, and means to spray water from said bottom casing portion upwardly in counterflow thereto into said air stream and through the channel located between said rear wall and the adjacent edges of said rows of pads and against said upper casing wall adjacent said intake opening, whereby incoming air flowing transversely of the upper portions of said water spray deflects the spray toward said baffle and onto said pads to moisten and flush the same.

2. The invention as claimed in claim 1, in which means are provided on said upper casing wall to cause water blown along said upper casing wall to drop onto the midportions of said pads.

References Cited in the file of this patent

UNITED STATES PATENTS

| | | |
|---|---|---|
| 872,384 | Smith | Dec. 3, 1907 |
| 1,609,611 | Dovel | Dec. 7, 1926 |
| 1,925,907 | Norris | Sept. 5, 1933 |
| 2,048,017 | McElvain | July 21, 1936 |
| 2,054,809 | Fleisher | Sept. 22, 1936 |
| 2,088,962 | Kleucker | Aug. 3, 1937 |
| 2,149,593 | Fleisher | Mar. 7, 1939 |
| 2,200,980 | Boynton et al. | May 14, 1940 |
| 2,428,842 | Feinberg | Oct. 14, 1947 |
| 2,607,714 | Smucker | Aug. 19, 1952 |
| 2,615,699 | Dixon | Oct. 28, 1952 |